United States Patent

Conant, Jr.

[15] 3,681,764

[45] Aug. 1, 1972

[54] LOW POWER MEMORY SYSTEM

[72] Inventor: Theodore A. Conant, Jr., Sylmar, Calif.

[73] Assignee: Litton Systems, Inc., Beverly Hills, Calif.

[22] Filed: March 15, 1971

[21] Appl. No.: 124,116

[52] U.S. Cl. ............................340/173 R, 340/172.5

[51] Int. Cl. ..............................................G11c 7/00

[58] Field of Search...340/173 AM, 173 R, 172.5, 174 M

[56] References Cited

UNITED STATES PATENTS 3,170,142 2/1965 Astrahan ......................340/173

*Primary Examiner*—Terrell W. Fears
*Attorney*—Alan C. Rose, Walter R. Thiel, Thomas A. Seeman, Alfred B. Levine and Harold E. Gillmann

[57] ABSTRACT

A memory system is disclosed which includes input means for receiving a binary word to be stored, in which the word comprises a plurality of bits each having either a "one" state or a "zero" state. Counting means are provided for counting the number of bits in the "one" state and for providing an output control signal whenever the number of such bits exceeds one-half of the number of bits in the word. The output signal of the counting means controls an input complementing gate which receives the word from the aforementioned input means and which places the word into its complemented state, that is into a state in which all of the "one" bits are changed into "zero" and all of the "zero" bits are changed into "one" bits, whenever the control signal is applied to the complementing gate. The word, in either its complemented or its uncomplemented state, is then applied to a conventional memory, and an additional control bit is also applied to the memory to indicate the complementary state of the word as being stored in the memory.

10 Claims, 4 Drawing Figures

THEODORE A. CONANT, JR.

INVENTOR

THEODORE A. CONANT, JR.
INVENTOR.

THEODORE A. CONANT, JR.
INVENTOR.

LOW POWER MEMORY SYSTEM

The present invention relates to memory systems and more particularly to an improved memory system in which the word or other information to be stored is placed in a condition so as to require the minimum power application to the memory to write the word.

Most digital computer systems include a memory section in which may be stored a plurality of binary words each consisting of a plurality of bits each having either a first state or a second state. It is a common practice in such systems to provide a register into which the word is initially written before it is transferred into the memory element per se. Depending upon the characteristics of a particular system, the bits of the word may be written into the various stages of the register either in series or in parallel. In either event, when it is desired to write the word from the register into the memory, each bit in the word is transferred from its respective stage of the register to a respective memory element in the memory, such as a magnetic core if the computer system uses a magnetic core type of memory.

In a binary code, the two states in which the bit can exist are usually designated as the "one" state and the "zero" state. Usually one state, such as the "one" state is indicated by a voltage or current pulse having a predetermined level, and the other or "zero" state is indicated by the absence of such a pulse at the particular instant in time, although sometimes the "zero" state is indicated by such a pulse on a second transmission line. The binary word is usually composed of a mixture of bits in the "one" state and the "zero" state, although obviously it is possible that a particular word may consist essentially entirely of bits in the "one" state and another word may consist of essentially entirely of bits in the "zero" state.

In most memory elements, such as in a magnetic core memory, when a bit is read out of the memory element, it is always restored to the "zero" state, whether a "one" bit or a "zero" bit was read out. For 2½D organizations, if it is desired to write another "zero" bit into that particular memory element, no power need be applied to the memory, since it is already in the "zero" state. However, when it is desired to write a "one" bit into that memory element, a finite amount of power must be applied, usually in the form of a current pulse, to transform the memory element into the "one" state. For 3D organizations, if it is desired to write a one, no additional "inhibit" power need be applied to the memory. However, when it is desired to retain the "-zerO" state, additional inhibit power must be applied during writing. Thus, in all such memory systems, a power supply must be supplied to write information into the memory and to read the information out of the memory.

As was noted above, the word being written into the memory may consist entirely of bits in the "zero" state, entirely of bits in the "one" state, or of a mixture of such bits. In all prior art memory systems, it has been necessary to equip the memory system with a power supply having sufficient size and power level capability to handle the worse case, which would be a word in which all of the bits were in the "one" state, since such a word would require the largest amount of power to read and to write each of the bits.

In many applications, particularly applications in which the memory system is used in aircraft, sPace vehicles or the like, volume and weight are at a premium. It is highly desirable, and frequently absolutely necessary, to minimize the size and weight of the components used in such systems. In many computer systems the power supply is a major contributor to the weight and bulk of the system. The utility of such systems could obviously be greatly enhanced if their power supply requirements were reduced without impairing the computing capability of the system.

It is accordingly an object of the present invention to provide an improved memory system.

It is another object of the present invention to provide an improved memory system which utilizes a smaller power supply.

It is still anOther object of the present invention to provide an improved memory system which, in its worst case, limits the number of bits which it must handle which are in the "one" state to no more than one-half of the number of bits in a word.

Briefly stated, and in accordance with the presently preferred embodiment of the invention, a memory system is provided which includes input means for receiving a binary word to be stored, in which the word comprises a plurality of bits each having either a "one" state or a "zero" state. Counting means are provided for counting the number of bits in the "one" state and for providing an output control signal whenever the number of such bits exceeds one-half of the number of bits in the word. The output signal of the counting means controls an input complementing gate which receives the word from the aforementioned input means and which places the word into its complemented state, that is into a state in which all of the "one" bits are changed into "zero" bits and all of the "-zero" bits are changed into "one" bits, whenever the control signal is applied to the complementing gate. Thus, the output word of the complementing gate never includes more than one-half of its bits in the "one" state. The word, in either its complemented or its uncomplemented state, is then applied to a conventional memory, and an additional control bit is also applied to the memory to indicate the complementary state of the word as being stored in the memory.

For a complete understanding of the invention, together with an appreciation of other objects and advantages thereof, please refer to the following detailed description of the attached drawings, in which.

Figure 1:
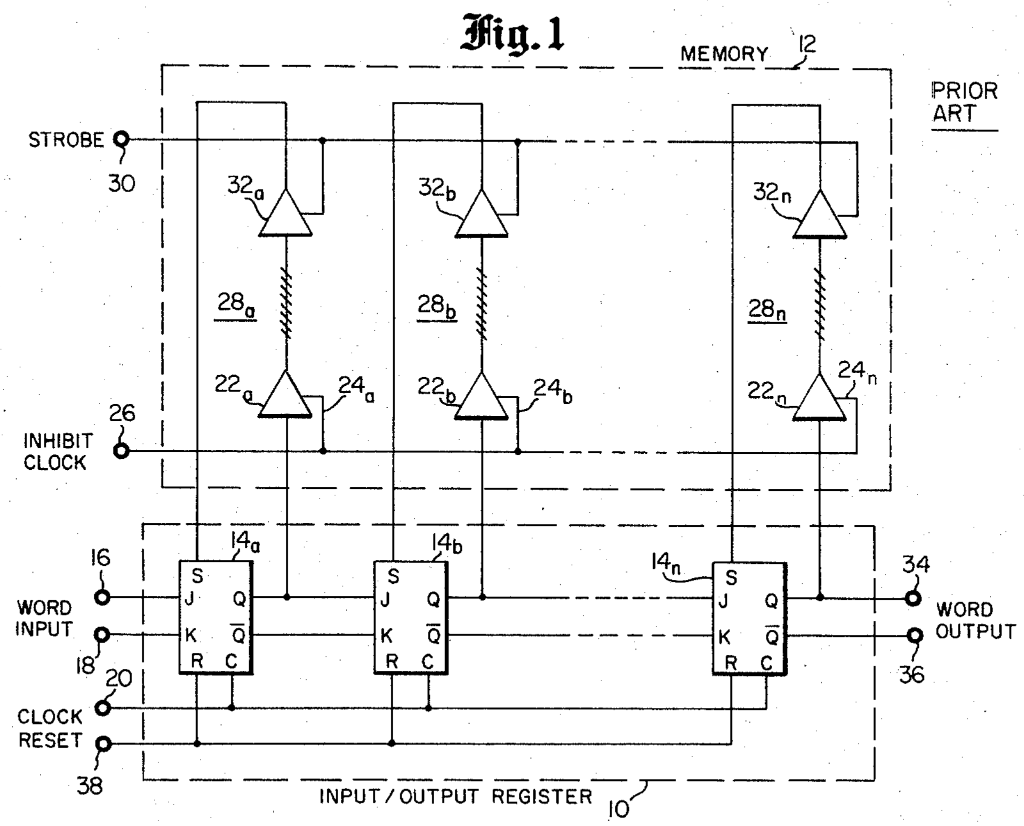
FIG. 1 shows a memory system in accordance with the prior art.

FIG. 1 shows a memory system in accordance to the prior art. As shown therein, the system includes an input/output register 10 and a memory 12. The register 10, which is designed to receive a word having n bits therein, consists of $n$ stages $\mathbf{14}_a$, $\mathbf{14}_b$ . . . $\mathbf{14}_n$. Each of known to stages 14 is a flip-flop circuit of the type known to those skilled in the art as J K flip-flops. Such flip-flops include input terminals J, K, S, R, and C and output terminals Q and $\bar{Q}$. When such flip-flops are in their "set" state, which in this discussion is assumed to be the "one" state, an output signal, or a signal or bit in the "one" state, appears on the Q output terminal and no output signal appears on the $\bar{Q}$ output terminal. Conversely, when the stages are in their "reset" state, which may be considered the "zero" state, no output signal appears on output terminal Q and an output signal appears on output terminal $\bar{Q}$. Such flip-flops are placed into their "set" state either by the application of a signal to the S input terminal or the simultaneous application of signals to the J and C input terminals. They are placed in the "reset" state either by the application of an input signal to the R input terminal or by the simultaneous application of input signals to the K and C input terminals. As was mentioned above, this type of flip-flop circuit is well known to those skilled in the art. A typical such flip-flop circuit is sold by Motorola under their model designation MC 3050.

The stages $14_a$, $14_b$ . . . $14_n$ of register 10 are connected in series to form a shift register. The output terminals Q and $\bar{Q}$ of a stage, such as $14_a$, are respectively connected to the input terminals J and K of the following stage, such as stage $14_b$. The binary word to be stored in memory 12 is first applied serially to word input terminals 16 and 18. For each bit in the binary word which is in the "one" state a pulse is applied to word input terminal 16 and for each bit in the "zero" state a pulse is applied to word input terminal 18. Simultaneously, clock pulses are applied to clock terminal 20, which is in turn directly connected to the C input terminals of each of the flip-flops 14. Thus, the bits of the binary word as applied to word input terminals 16 and 18 are serially shifted down the stages $14_a$, $14_b$, etc. until the word of n bits is completely loaded into register 10.

After all of the bits of the binary word are loaded into the various stages 14 of register 10, the word may be transferred in parallel into memory 12, which in the shown embodiment is b . . . magnetic core memory. The output terminal Q of each stage 14 is connected to the input terminal of a gated amplifier 22 corresponding to that particular bit of the word. The gate terminals 24 of each of the gated amplifiers 22 are all connected to a common terminal 26, to which a signal commonly known as the inhibit clock signal is applied when it is desired to gate amplifiers 22 to pass the output signals of the stages 14 into memory 12 to be written therein. The output signal of each of the gated amplifiers 22, which are also sometimes called bit drivers, appears on a conductor which is threaded through a plurality of magnetic cores 28. The magnetic cores $28_a$ represent the first bits of each of the words which memory 12 is capable of storing, the magnetic cores $28_b$ represent the second bits and so on until the magnetic cores $28_n$ represent the *n*th or final bit of each word. The particular cores into which the bits are to be written when the inhibit clock signal is applied to terminal 26 are separately addressed by means (not shown in FIG. 1) well known to those skilled in the art. The sequence just described under which a word which has been applied to register 10 through input terminals 16 and 18 is written into memory 12 is usually called the clear-write cycle of the memory.

When it is desired to read a word out of a particular address in memory 12, a strobe signal is applied to terminal 30 which gates a plurality of gated amplifiers $32_a$, $32_b$ . . . $32_n$ which in turn pass and amplify the output signals of the bits of the particular addressed word in the memory. Again, the addressing means are not shown. The output signals of amplifiers 32 are then applied to the S input terminals of flip-flops 14 to place the word to be read out into the various stages of register 10. Thus, register 10 serves as both an input register and an output register and is usually called an input/output register. When the word is written into register 10, the inhibit clock signal is again applied to terminal 26 to rewrite the word back into its old address so that it will not be lost. However, after this occurs, the word still remains in register 10 and clock pulses are then applied to terminal 20 to step the word down the shift register and out the word output terminals 34 and 36. Thus, the word is read out of register 10 and restored again to memory 12, and this cycle is called the read-restore cycle.

The memory system of FIG. 1 also usually includes a reset terminal 38 to which a reset signal may be applied to restore all of the stages 14 of shift register 10 to the reset or "zero" state.

As was noted above, it requires essentially no energy or power to read or write a "zero" bit into or out of memory 12, but it requires a finite amount of energy to read or write a "one" bit into or out of memory 12. Thus, if the binary word being written into or out of memory 12 includes a large plurality of "one" bits, much more energy is expended by gates amplifiers 22 writing the word into memory 12 and by gated amplifiers 32 reading the word out of the memory. The power supplies for these amplifiers must be designed to have sufficient capacity to read and write words in which all of the bits are "one".

Figure 2:
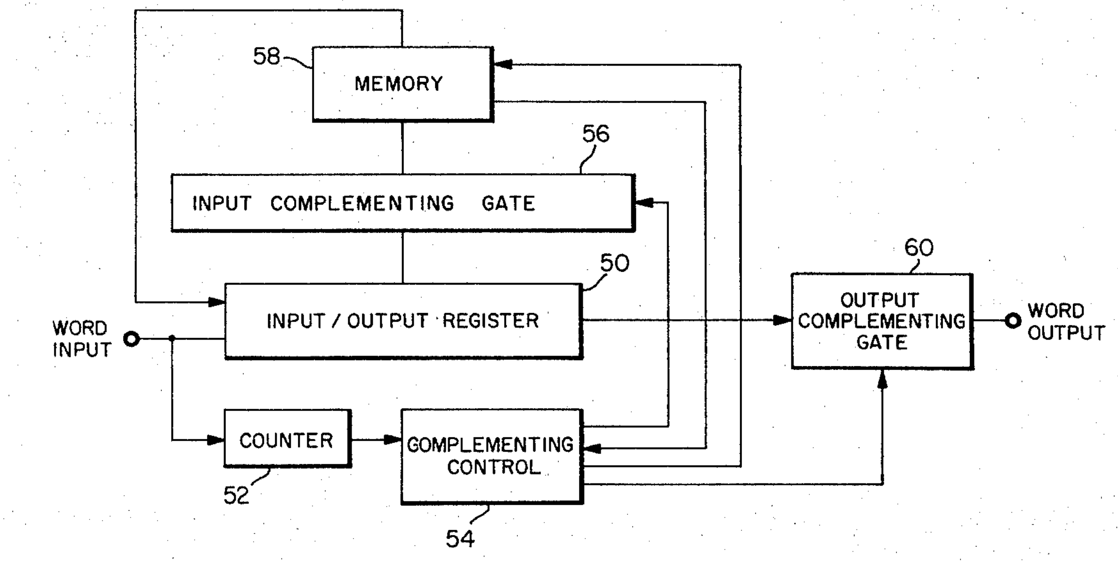
FIG. 2 shows a block diagram of a memory system in accordance with the present invention.

FIG. 2 shows a block diagram of a memory system in accordance with the present invention in which, for a memory of the same capacity, the maximum power requirements are reduced to approximately one-half of the requirements of the memory system of FIG. 1, thus resulting in substantial saving in the size and weight of the required power supply. As shown therein, a binary word of n stages is applied to an input/output register 50 similar to register 10 of FIG. 1. The bits of the word are also applied to a counter 52 which counts only those bits in the "one" state. When a number of such bits exceeds a predetermined number, usually one-half of *n*, counter 52 supplies an output signal to complementing control 54. An input complementing gate 56 is also provided which receives the bits of the word from register before they are written into memory 58. Input complementing gate 56 also receives a contrOl signal from complementing control 54. The characteristics of complementing gate 56 are such that if a control signal is applied thereto, it provides output signals which are the complement of its input signals, while if no control signal is applied thereto, it provides output signals the same as its input signals. "Complementing" in this sense meanS to reverse the state of each bit, so as to provide a "zero" state output signal for each "one" state input signal and a "one" state output signal for each "zero" state input signal. The output signals of input complementing gate 58, which represent the input word either in its complemented or uncomplemented state, are then applied to memory 58 for writing and subsequent reading in the same manner as described in FIG. 1 above. Thus, no matter how many of the bits in the word as applied to register 50 are in the "one" state, no more than $n/2$ of the bits in the word as written into memory 58 can be in the "one" state, and the power supply requirements for reading and writing these bits into memory 58 can be reduced substantially by one-half.

Complementing control 54 also writes directly into memory 58 a control bit which indicates the complementary state of the word as it is supplied to memory 58 from input complementing gate 56. For example, the control bit might be in the "one" state if the word as written is complemented from the word as originally supplied to register 50, and conversely would be in the "zero" state if there are sufficiently few "one" bits in the word so that input complementing gate 56 is not triggered and the word is written into memory 58 as received at register 50.

When it is desired to put the memory system of FIG. 2 through its read-restore cycle in order that the word may be read out for subsequent calculation or manipulation, the word in its complementary state as stored in memory 58 is read out into register 50 in the same manner as described in FIG. 1 above. The control bit is simultaneously read out of memory 58 into complementing control 54. The word and the control bit are both then restored to memory 58, with the word passing through input complementary gate 56 with no control signal on gate 56, thereby being written back into memory 58 in the same complementary state. If the word was originally complemented before storage in memory 58, complementing control 54 supplies a control signal to an output complementing gate 60 which receives the word from register 50 and recomplements it back to its state as originally received by register 50. If the control bit as received at complementary control 54 indicates that the word as stored in memory 58 was never complemented, complementing control 54 supplies no control signal to output complementing gate 60, and gate 60 passes the word, still in its complementary state as originally received, without recomplementing and thus the output word is the same as the input word.

Figure 3:
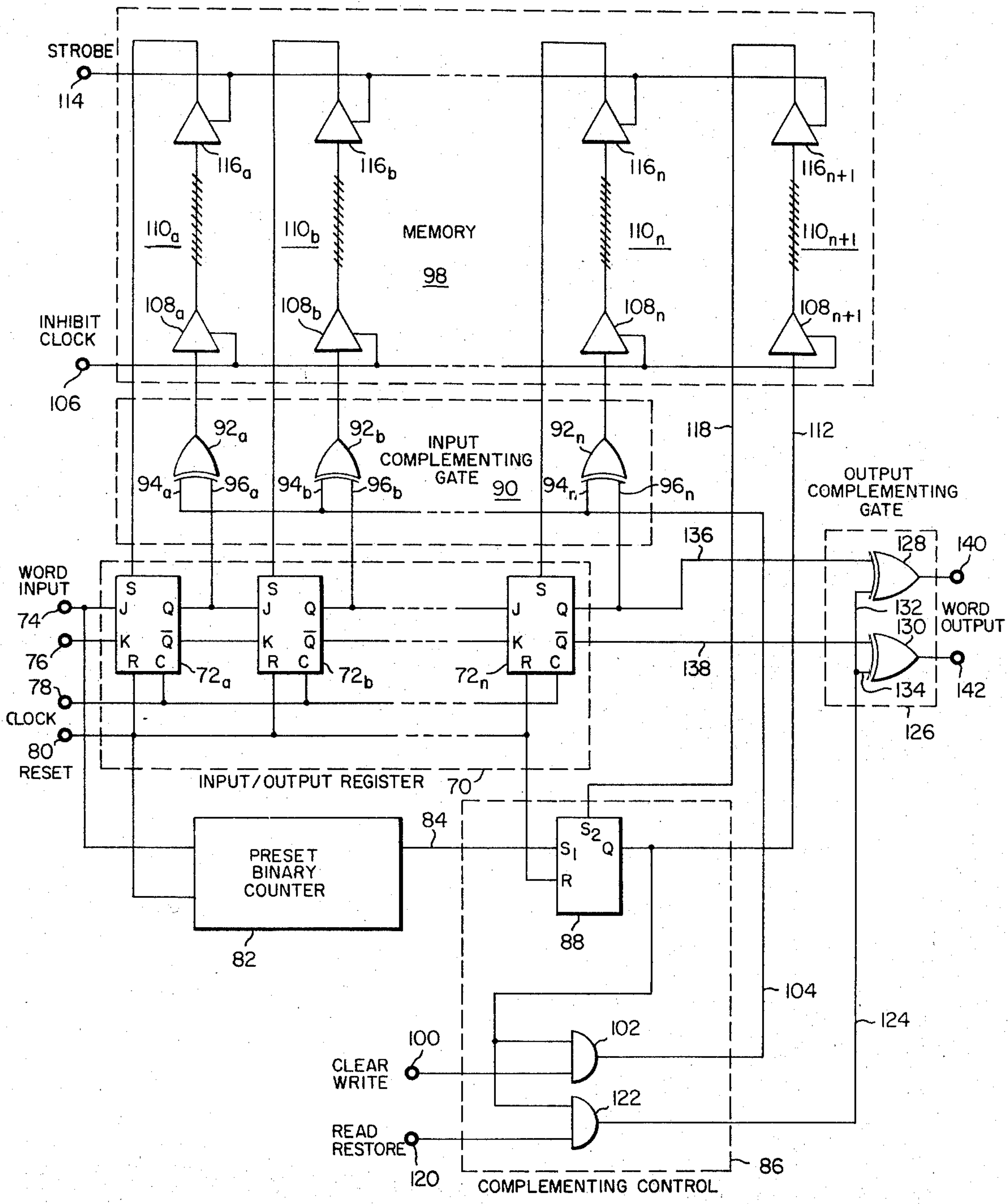
FIG. 3 shows a specific embodiment of the memory system of FIG. 2 in which the bits of the word are received in series.

FIG. 3 shows a schematic diagram of a specific embodiment of the memory system of FIG. 2 in which the bits of the binary word are received in series, as in FIG. 1 above. The system includes an input/output register 70 which is the same as the register 10 of FIG. 1. The register 70 comprises a plurality of J K flip-flop stages $72_a$, $72_b$ . . . $72_n$ each of which corresponds to a respective bit in the binary word, word input terminals 74 and 76 which receive the pulses which form the bits of the binary word and which are attached to the input terminals J and K respectively of the first stage $72_a$ of register 70, a clock input terminal 78 which is attached to all of the C input terminals of the stages 72 and a reset input terminal 80 which is attached to all of the R input terminals of the stages 72 of register 70. Terminal 80 is also connected to the preset binary counter 82 and complementing contrOl 86, described below, to reset all of the elements of the memory system simultaneously.

A preset binary counter 82 is provided which receives as its input from word input terminal 74 all of the bits which are in the "one" state. Counter 82, which may be any of the various types of such counters well known to those skilled in the art, is programmed to provide an output signal in line 84 whenever the count of the bits in the "one" state exceeds a predetermined number, which would ordinarily be $n/2$, where n is the maximum number of bits which the input binary word might obtain.

Complementing control 86 includes a flip-flop 88 which has two "set" input terminals $S_1$ and $S_2$ and a "reset" input terminal R. As is well known, such flip-flops may be placed in their "set" state by the application of a signal to either of input terminal $S_1$ and $S_2$, in which event an output signal appears on output terminal Q. The application of signal to input terminal R places flip-flop 88 in its reset condition, in which state no output signal appears on output terminal Q. The other terminals of the flip-flop are not shown since they are not used in this embodiment. Thus, in this shown arrangement, whenever the number of bits in the binary input word which are in the "one" state exceeds half of the bits in the word, counter 82 provides a signal over line 84 to input terminal $S_1$ of flip-flop 88 to place flip-flop 88 in its "set" state and to provide an output signal on the output terminal Q of flip-flop 88.

The memory system of FIG. 3 also includes an input complementing gate 90 which as shown comprises a plurality of EXCLUSIVE OR gates $92_a$, $92_b$ . . . $92_n$ each corresponding to a respective one of the stages of register 70. Each of the EXCLUSIVE OR gates 92 includes a first input terminal 94 and a second input terminal 96. Each of the input terminals $94_a$, $94_b$ . . . $94_n$ are connected together to receive a control signal from complementing control 86. Each of the second input terminals $96_a$, $96_b$ . . . $96_n$ are connected to the Q output terminal of the respective stage $72_a$, $72_b$ . . . $72_n$ of register 70.

When an input word has been fully loaded into register 70 and it is desired to write this word into memory 98 of the system, thereby effecting the clear-write cycle described above, a clear-write input signal is applied to input terminal 100 of complementing control 86, in which it is applied to one of the terminals of an AND gate 102. The other input terminal of AND gate 102 receives its input signal from the output terminal Q of flip-flop 88. If flip-flop 88 is in its "se" state, thereby indicating that over half of the bits of the input word as received are in the "one" state, a signal then exists on each of the input terminals of AND gate 102 and this gate provides an output signal which is carried over a line 104 to all of the first input terminals 94 of EXCLUSIVE OR gates 92 in input complementing gate 90. These EXCLUSIVE OR gates 92 then serve to complement or invert all of the output signals of the stages 72 of register 70, and the output signals from input complementing gate 90 are thus the complement of the input word as received at word input terminals 74 and 76. An inhibit clock signal is then applied to terminal 106 to gate all of the gated amplifiers 108 to write the complemented word into the properly addressed magnetic core 110.

If, however, flip-flop 88 is in its "reset" state, thereby indicating that less than one-half of the bits of the input word as received at word input terminal 74 and 76 are in the "one" state, AND gate 102 does not pass a control signal onto line 104 and thus effectively a signal having the "zero" state is applied to the first input terminals 94 of EXCLUSIVE OR gates 92. These gates then pass the output signals from their respective stages 72 of register 70 in their "as received" or uncomplemented state and the output signals from input complementing gate 90 are the same as the word as received at word input terminals 74 and 76. Now when the inhibit clock signal is applied to terminal 106 to trigger gated amplifiers 108, the word as received in its uncomplemented state is written into the properly addressed magnetic core 110.

The output signal from terminal Q of flip-flop 88 is also applied over a line 112 to the input terminal of a gated amplifier $\mathbf{108}_{n+1}$ in memory 98, which gated amplifier is also triggered by the inhibit clock signal applied to terminal 106. The signal on line 112, which may be termed the control bit, is then written into a properly addressed magnetic core $\mathbf{110}_{n+1}$ in memory 98 at the same time as the output signals from input complementing gate 90 are written into memory 98. This control bit thus serves to indicate the complementary state of the word as actually written into memory 98, and is ordinarily a control bit in the "one" state when the word as written is the complement of the word as received and is a control bit in the "zero" state when the word as written is the same as the word as received.

When it is desired to read a selected word out of memory 98, thereby effecting the read-restore cycle described above, the selected magnetic cores $\mathbf{110}_a$, $\mathbf{110}_b$ . . . $\mathbf{110}_n$, $\mathbf{110}_{n+1}$ are properly addressed. A strobe pulse is applied to terminal 114, which triggers gated amplifiers $\mathbf{116}_a$, $\mathbf{116}_b$ . . . $\mathbf{116}_n$, $\mathbf{116}_{n+1}$. The output terminals of the gated amplifiers $\mathbf{116}_a$, $\mathbf{116}_b$ . . . $\mathbf{116}_n$ are connected to the respective S input terminals of the stages $\mathbf{72}_a$, $\mathbf{72}_b$ . . . $\mathbf{72}_n$ of register 70, thereby placing these stages in states indicative of the addressed word as stored in memory 98. The output signal of gated amplifier $\mathbf{116}_{n+a}$, which signal represents the state of the above mentioned control bit, is applied over line 118 to the input terminal $s_2$ of flip-flop 88 in complementing control 86. Flip-flop 88 is thus placed in a state indicative of the complementary state of the addressed word as stored in memory 98. At this time, an inhibit clock pulse is applied to terminal 106 to gate the amplifiers 108 into conduction. Since no input signal is being applied to the first input terminals 94 of the EXCLUSIVE OR gates 92 of input complementing gate 90, the word in the complementary state as read out of memory 98 into register 70 is rewritten into the properly addressed cores $\mathbf{110}_a$, $\mathbf{110}_b$ . . . $\mathbf{110}_n$ and the control bit indicative of the complementary state of the word as thus written is rewritten into core $\mathbf{110}_{n+1}$.

A "read-restore" signal is then applied to input terminal 120 of complementing control 86, which signal is applied as one of the inputs to an AND gate 122. The other input terminal of AND gate 122 is connected to output terminal Q of flip-flop 88. If flip-flop 88 is now in its "set" state, thereby indicating that the word now in register 70 and ready to be read out of register 70 is in its complemented state, AND gate 122 has an input signal on both of its input terminals and thus provides an output signal on line 124 which may be thought of as a bit in the "one" state. However, if flip-flop 88 is now in its "reset" state, thereby indicating that the word now in register 70 was stored in memory 98 in its "as received" uncomplemented state, there is no signal on output terminal Q of flip-flop 88. Now, AND gate 122 does not have an input signal on both of its input terminals, and thus provides no output signal, or a signal which may be considered to be a bit in the "zero" state, on line 124.

The memory system as shown in FIG. 3 also includes an output complementing gate 126 which as shown includes two EXCLUSIVE OR gates 128 and 130, each having a first respective input terminal 132 and 134 and a second respective input terminal 136 and 138. The line 124 is connected directly to both of the first input terminals 132 and 134 of EXCLUSIVE OR gates 128 and 130 respectively, while the Q output terminal of the final stage $\mathbf{72}_n$ of register 70 is connected to the second input terminal 136 of EXCLUSIVE OR gate 128 and the $\bar{Q}$ output terminal of the final stage $\mathbf{72}_n$ of register 70 is connected to the second input terminal 138 of EXCLUSIVE OR gate 130.

Continuing now the description of the read-restore cycle, clock pulses are applied to input terminal 78 of register 70, which pulses cause the stages 72 of the register 70 to begin shifting the bits down and out the register in the manner described in connection with FIG. 1 above. If an output signal now exists on line 124, indicating that the word as being stepped out of register 70 is actually the complement of the word which is desired, EXCLUSIVE OR gates 128 and 130 in output complementing gate 126 complement or invert the signals as applied to their second input terminals 136 and 138 respectively from the output terminals Q and $\bar{Q}$ of the final stage $\mathbf{72}_n$ of register 70, thereby providing the properly restored serial binary word on word output terminals 140 and 142. However, if no signal exists on line 124, thereby indicating that the word as stored in memory 98 and as now exists in register 70 is still in its original uncomplemented state, the EXCLUSIVE OR gates 128 and 130 of output complementing gate 126 have no effect on the word as being stepped out of the terminals Q and $\bar{Q}$ on a final stage $\mathbf{72}_n$ of register 70, and again the serial output word as appears on word output terminals 140 and 142 is in its proper complementary state.

Figure 4:
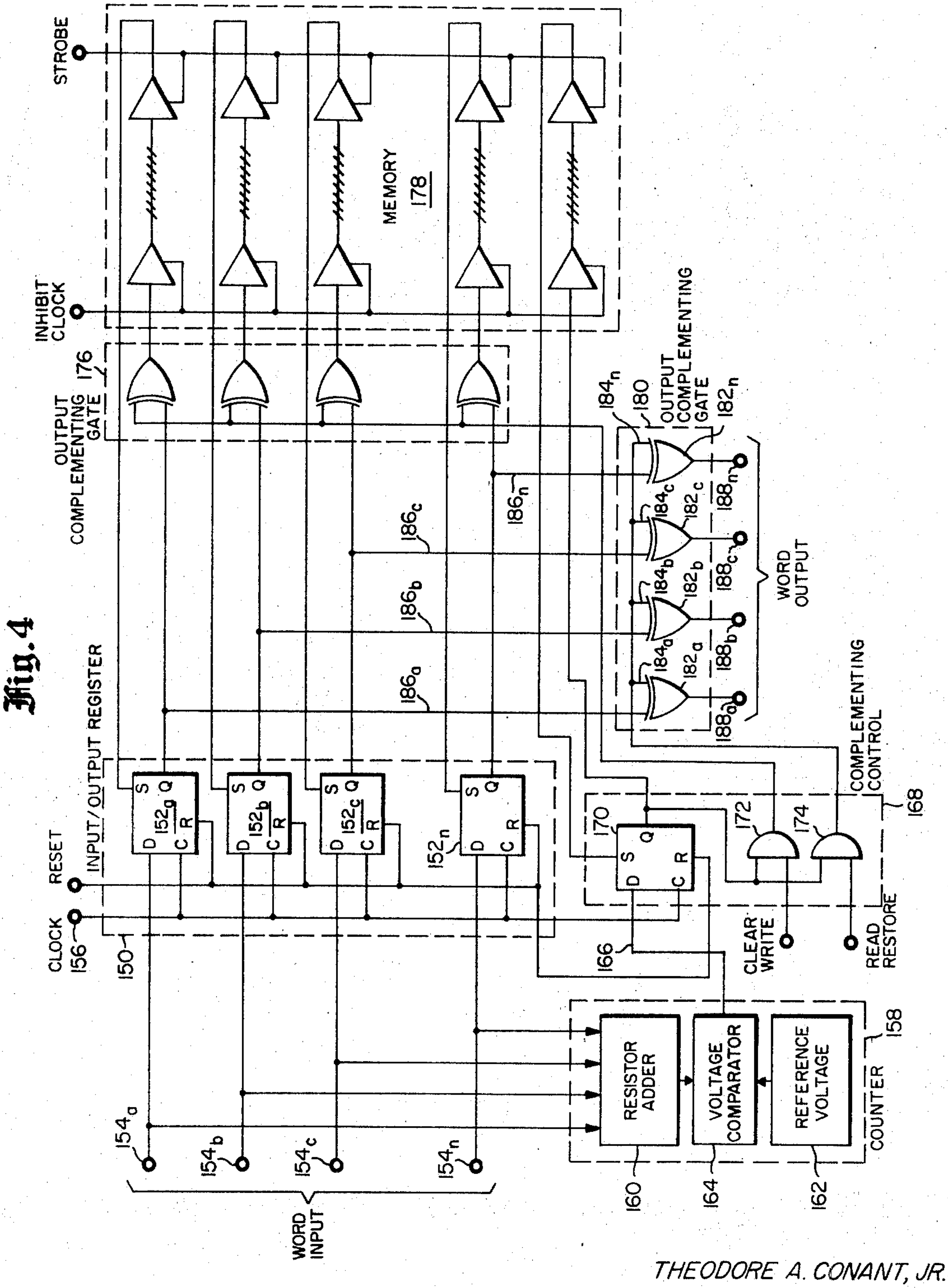
FIG. 4 shows a second specific embodiment of the memory system of FIG. 2 in which the bits of the word are received in parallel.

FIG. 4 shows a schematic diagram of a second specific embodiment of the memory system of FIG. 2 in which the bits of the input binary word are received in parallel. As shown therein, the input/output register 150 now comprises a plurality of parallel flip-flops $\mathbf{152}_a$, $\mathbf{152}_b$, $\mathbf{152}_c$ . . . $\mathbf{152}_n$. Each of these flip-flops includes input terminals S, R, D and C and an output terminal Q. The nature of these flip-flops is such that the application of a signal to input terminal S places the flip-flop in its "set" state and provides an output signal on output terminal Q. The application of an input signal to input terminal R places the flip-flop in its "reset" state, in which state no output signal is present on output terminal Q. (An output signal would appear on an output terminal $\bar{Q}$, but this terminal is not shown in FIG. 4 since this signal is not used in the embodiment as shown therein). The application of simultaneous signals to the input terminals D and C also causes the flip-flop to assume its "set" state, thereby providing an output signal on output terminal Q. Such flip-flops are well known to those skilled in the art and are sometimes termed D flip-flops. A typical such flip-flop is marketed by Motorola under their model designation Mc 3060.

A binary word input having n bits in parallel is simultaneously applied to the word input terminals $154_a$, $154_b$, $154_c$ . . . $154_n$, which terminals are directly connected to the D input terminal of a respective flip-flop 152 in register 150. Simultaneously with the application of the binary word bits to the word input terminals 154 a clock pulse is applied to input terminal 156, which terminal is connected directly to the C input terminals of each of the flip-flops 152. The simultaneous application of the input word onto terminals 154 and the clock pulse onto terminal 156 thus serves to set the various stages 152 of register 150 into states corresponding to the particular binary word applied to word input terminals 154.

The various bits of the binary word as received at word input terminals 154 are also connected to a counter 158 which again provides an output signal if the number of bits in the binary word which are in the "one" state exceeds n/2. In the parallel embodiment of FIG. 4, all of the bits are applied to a resister adder 160, such as is well known to those skilled in the art, which adder provides an analog voltage output having a level indicative of the number of bits in the word which are in the "one" state. A reference voltage 162 is included in counter 158 which has a voltage level output corresponding to the analog voltage output which resistor adder 160 would have if exactly $n/2$ of the bits were in the "one" state. The outputs of both the adder 160 and the reference voltage 162 are applied to a simple voltage comparator 164 which provides an output signal on line 166 only when the output signal of adder 160 exceeds the signal from reference voltage 162. Line 166 thus provides a signal to complementing control 168 only when the number of bits of the word in the "one" state exceeds n/2.

Complementing control 168 includes a D flip-flop 170 similar to the flip-flops in register 150. The line 166 is connected to the D input terminal of flip-flop 170, and thus flip-flop 170 is placed in its "set" state, thereby providing an output signal at its Q output terminal, whenever the number of bits in the input word in the "one" state exceeds $n/2$. Complementing control 168 also includes AND gates 172 and 174 similar in structure and function to the AND gates 102 and 122 of complementing control 86 of FIG. 3.

The memory system of FIG. 4 also includes an input complementing gate 176 which as shown is identical in structure and function to the input complementing gate 90 of the system of FIG. 3 and a memory 178 which as shown is identical in structure and function to the memory 98 of FIG. 3. Accordingly, details of the internal structure of these components are not described again.

In the clear-write mode, the embodiment of FIG. 4 functions similarly to that described in detail in FIG. 3 above. The bits of the word are applied from the respective stages 152 of register 150 to input complementing gate 176. If flip-flop 170 is in the "set" state, indicating that the word is to be complemented by gate 176, clear-write AND gate 172 provides the necessary control signal to input complementing gate 176 to complement the entire word, which complemented word is then written into memory 178, together with a control bit from flip-flop 170 indicating that the word is being stored in its complemented state. Conversely, if the word is not to be complemented, AND gate 172 provides no signal to input complementing gate 176, and gate 176 passes the word directly in its uncomplemented state to be written into memory 178, and flip-flop 170 provides in effect a "zero" state control bit to memory 178 to indicate that the word is written in its uncomplemented state.

The read/restore mode of the embodiment of FIG. 4 differs only slightly from that of FIG. 3. The addressed word is read out of memory 178 and placed in the respective stages 152 of register 150 in a manner similar to that described in FIG. 3 above. Now, however, since the bits of the word are to be read out in parallel, output complementing gate 180 comprises a plurality of EXCLUSIVE OR gates $182_a$, $182_b$, $182_c$ . . . $182_n$ each corresponding to a respective one of the stages 152 of register 150.

Each of the EXCLUSIVE OR gates 182 of output complementing gate 180 includes a first terminal 184 and a second terminal 186. The first terminals $184_a$, $184_b$, $184_c$ . . . $184_n$ are all connected together and are connected to the output terminal of read/restore AND gate 174 in complementing control 168. The second input terminals $186_a$, $186_b$, $186_c$ . . . $186_n$ are each connected to the Q output terminal of their respective stage 152 of register 150. If the word now temporarily held in register 150 which is to be read out through word output terminals $188_a$, $188_b$, $188_c$ . . . $188_n$ is presently in its complemented state, AND gate 174 provides a signal to the first input terminals 184 of EXCLUSIVE OR gates 182 and these gates each complement or invert the signal being stored in their respective stages 152, thereby providing the output binary word in parallel on word output terminals 188 in its proper complementary state. However, if complementing control 168 indicates that the word as being temporarily held in register 150 is already in its proper complementary state, no output signal is applied to the first input terminals 184 of EXCLUSIVE OR gates 182, and these gates then pass the signal directly in its original or non-complemented state from register 150 to word output terminals 188.

While the invention is thus disclosed and several specific embodiments described in detail, it is not intended that the invention be limited to these shown embodiments. Instead, many modifications will occur to those skilled in the art which lie within the spirit and scope of the invention. For example, by careful design, many of the components in the input complementing gates and the output complementing gates could be combined to effect a saving in cost and weight. Also, although in both shown embodiments a magnetic core memory is utilized, the invention is not limited to use in such memory systems. The invention would have equal utility in any memory system in which it is desired to reduce the number of bits which must be written into and read out of the memory. It is thus intended that the invention be limited in scope only by the appended claims.

What is claimed is:

1. A memory system comprising, in combination:

input means for receiving a binary word to be stored, said word comprising a plurality of bits each having either a first state or a second state, counting means for providing an output signal whenever the number of bits in said word having said first state exceeds a predetermined number, input complementing gate means whose output signals are the complement of its input signals if a control signal is applied to said input gate means and whose output signals are the same as its input signals if no control signal is applied to said input gate means, means for applying said word from said input means to said input gate means as the input signals to said input gate means, means for applying a control signal to said input gate means which is indicative of the state of the output signal from said counting means, a memory, means for applying the output signals of said input gate means to said memory, and means for storing a control bit in said memory indicating the complementary state of said word as stored in said memory.

2. The memory system of claim 1 which further comprises:

output complementing gate means whose output signals are the complement of its input signals if a control signal is applied to said output gate means and whose output signals are the same as its input signals if no control signal is applied to said output gate means, output means for applying said word in its complementary state as stored in said memory to said output gate means as the input signal to said output gate means, and means for applying a control signal to said output gate means which is indicative of the state of said control bit.

3. The memory system of claim 2 which further includes complementary control means for generating a control signal for said input gate responsive to the output signal of said counting means and for generating a control signal for said output gate responsive to said control bit.

4. The memory system of claim 3 in which said output means comprises:

a register having a plurality of stages each having input and output terminals, means for applying each bit of said word in its complementary state as stored in said memory to an input terminal of a respective one of said stages of said register, and means for applying the output signals from said register to said output complementary gate.

5. The memory system of claim 4 in which said input means comprises said register and means for applying each bit of said word as received at said memory system to an input terminal of a respective one of said stages of said register.

6. The memory system of claim 5 in which said input complementing gate means comprises a plurality of EXCLUSIVE OR gates each having a first and second input terminal and an output terminal, means connecting said first input terminals of said EXCLUSIVE OR gates to receive a control signal from said complementing control means, and means connecting each of said second input terminals of said EXCLUSIVE OR gates to the output terminal of a respective one of the stages of said register.

7. The memory system of claim 6 in which the bits of said word are received in series, the stages of said register are connected in series to form a shift register and said word is applied to input terminals of the first stage of said shift register and in which said output complementing gate comprises an EXCLUSIVE OR gate having a first and second input terminal and an output terminal, means connecting said first input terminal to receive a control signal from said complementing control means, and means connecting said second input terminal to the output terminal of the final stage of said shift register.

8. The memory system of claim 7 in which said counting means comprises a preset binary counter and means applying all of the bits of said word having said first state of said counter.

9. The memory system of claim 6 in which the bits of said word are received in parallel and are each applied to the input terminals of a respective one of the stages of said register and in which said output complementing gate means comprises a plurality of EXCLUSIVE OR gates each having a first and second input terminal and an output terminal, means connecting said first input terminals to receive a control signal from said complementing control means and means connecting each of said second input terminals to the output terminal of a respective one of the stages of said register.

10. The memory system of claim 9 in which said counting means comprises a resister adder, means applying all of the bits of said word to said adder, and means for obtaining an output signal whenever the output of said adder exceeds a predetermined value.

* * * * *